United States Patent
Zenner

(10) Patent No.: US 6,718,330 B1
(45) Date of Patent: Apr. 6, 2004

(54) PREDICTIVE INTERNET AUTOMATIC WORK DISTRIBUTOR (PRE-IAWD) AND PROACTIVE INTERNET AUTOMATIC WORK DISTRIBUTOR (PRO-IAWD)

(75) Inventor: Hal B. Zenner, Fair Haven, NJ (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/465,003

(22) Filed: Dec. 16, 1999

(51) Int. Cl.[7] .............................................. G06F 17/30
(52) U.S. Cl. ....................... 707/10; 707/104.1; 709/105
(58) Field of Search .............................. 707/10, 1, 2, 6, 707/104.1; 709/206, 217, 218, 219, 103, 104, 105

(56) References Cited

U.S. PATENT DOCUMENTS

| | | | |
|---|---|---|---|
| 5,355,327 A | * 10/1994 | Stent et al. ................... 702/187 |
| 5,432,909 A | 7/1995 | Cok ............................ 395/200 |
| 5,488,609 A | * 1/1996 | Hluchyj et al. ................ 370/84 |
| 5,519,773 A | * 5/1996 | Dumas et al. ................ 379/265 |
| 5,539,883 A | 7/1996 | Allon et al. ............ 395/200.11 |
| 5,592,543 A | * 1/1997 | Smith et al. ................. 379/265 |
| 5,715,453 A | 2/1998 | Stewart ....................... 395/615 |
| 5,745,687 A | 4/1998 | Randell ................. 395/200.31 |
| 5,745,892 A | 4/1998 | Miyata et al. ............... 707/102 |
| 5,761,507 A | 6/1998 | Govett ........................ 395/684 |
| 5,761,663 A | 6/1998 | Lagarde et al. ............... 707/10 |
| 5,774,660 A | 6/1998 | Brendel et al. ......... 395/200.31 |
| 5,778,224 A | 7/1998 | Tobe et al. ................... 395/670 |
| 5,799,297 A | 8/1998 | Goodridge et al. ............. 707/1 |
| 5,915,011 A | * 6/1999 | Miloslavsky ................. 379/219 |
| 5,940,497 A | * 8/1999 | Miloslavsky ................. 379/265 |
| 5,963,635 A | * 10/1999 | Szlam et al. ................. 379/309 |
| 6,021,428 A | * 2/2000 | Miloslavsky ................. 709/206 |
| 6,044,146 A | * 3/2000 | Gisby et al. ................. 379/265 |
| 6,044,368 A | * 3/2000 | Powers ........................... 707/2 |
| 6,115,737 A | * 9/2000 | Ely et al. ..................... 709/203 |
| 6,138,162 A | * 10/2000 | Pistriotto et al. ............ 709/229 |
| 6,272,544 B1 | * 8/2001 | Mullen ......................... 709/226 |
| 6,404,747 B1 | * 6/2002 | Berry et al. ................. 370/270 |

* cited by examiner

Primary Examiner—Uyen Le
(74) Attorney, Agent, or Firm—Lowe, Hauptman, Gilman & Berner, LLP

(57) ABSTRACT

A Predictive IAWD (Pre-IAWD) initially assigns inbound work to an agent in a group of agents based on a dynamically generated prediction of work completion time. The Pre-IAWD initially assigns the work to the agent having the highest likelihood of completing the work first in the group of agents, based on a prediction generated by a Pre-IAWD algorithm based on dynamically measured factors, such as a current work load of each agent, a priority of the work, and an experience level and skill set of each agent. A Proactive IAWD (Pro-IAWD) reassigns work initially assigned to agents by the Pre-IAWD based on a set of predetermined rules, to maintain an equitable work load across the agent group.

18 Claims, 4 Drawing Sheets

PREDICTIVE INTERNET AUTOMATIC WORK DISTRIBUTOR (PRE-IAWD) AND PROACTIVE INTERNET AUTOMATIC WORK DISTRIBUTOR (PRO-IAWD)

RELATED APPLICATIONS

The present application is related to co-pending applications entitled "INTELLIGENT KNOWLEDGE BASE CONTENT CATEGORIZER (IKBCC)", Ser. No. 09/410, 994, filed on Oct. 1, 1999 and "INTELLIGENT INTERNET WORK DEFLECTOR (IIWD), Ser. No. 09/410,996, filed on Oct. 1, 1999.

FIELD OF THE INVENTION

The present invention relates generally to a method of assigning work to customer service agents, and more particularly, to a method of initially assigning, and then, if necessary, reassigning inbound on-line customer requests to Internet self-service agents.

BACKGROUND OF THE INVENTION

The Internet is increasingly used to provide "self-service" to customers and users. Users often use the Internet to obtain specific product or service information, and to find answers to questions or solutions to various problems. As is typical with other types of self-service operations, such as voice response used in telephone systems often referred to as Automatic Call Distributors (ACD), users using an Internet self-service application are first encouraged to obtain information on-line before interacting with a human or intelligent/robotic agent. When human assistance is needed, a user may compose a question or issue a request and then the self service application routes the question or request to a human agent. The human agent typically accepts the work (e.g., opens a "case"), composes a response (or initiates some other related work) thus resolving or not resolving the open case, then finally closes the case or transfers the case to a different agent.

This type of Internet self-service application can be referred to as an Internet Automatic Work Distributor (IAWD) mechanism. The IAWD that initially "assigns" the work (i.e., the case) to an agent is primitive compared to routing mechanisms found in telephony Automatic Call Distributors. For example, the concept of "busy" or "not ready" as is found in ACDs is typically not found in IAWDs. In contrast to ACDs, the self-service application simply assigns work to the agent since there are no users on line, and thus, no users to put "on hold"—instead, work is queued or assigned to a specific agent. Therefore, an agent may be assigned several unopened cases, even if the agent is already working a case. Over time, work may become unequally distributed across a group of agents. For example, if an agent's current case takes an inordinate length of time to complete, other high priority cases assigned to the agent are left waiting, whereas another agent in the same agent group may at that moment be completing a current case and only have lower priority cases waiting.

Even if the self-service application could initially distribute work fairly, for example, to minimize the time taken to service a high priority request, over time, work can still become unequally distributed across the group of agents for several reasons. First, an agent may work faster than other agents, thus allowing the agent to finish servicing his or her current request (i.e., complete the work assigned) more quickly than the other agents. Second, work assigned to an agent may be less complex relative to the work assigned to other agents, thus allowing the agent to complete the work more quickly than the other agents. Third, an agent may finish his or her work and have low priority work waiting to be serviced, while high priority work is assigned to a different agent (or agents) currently working on a case.

In telephony applications such as call centers, predictive outbound systems are commonly used. The outbound system generates outbound calls, predicting that when the called party answers the call, an agent will be available to service the call. The system then dynamically assigns the agent to the answered call.

A need exists to initially assign inbound work to an agent based on a dynamically generated prediction of how soon the work can be completed by the agent to expedite completion of the work. There is a further need to proactively and periodically reassign work to agents after the work is initially assigned to the agents to maintain an equitable distribution of the work across the agents.

SUMMARY OF THE INVENTION

It is, therefore, an object of the present invention to expedite servicing of an inbound request by initially assigning the request to an agent based on a dynamic prediction of how soon the request can be serviced by the agent.

Another object of the present invention is to maintain an equitable distribution of work across a group of agents by proactively and periodically reassigning work within a group to other agents within the group, after the work is initially assigned to agents in the group.

According to one aspect of the present invention, to exploit the Internet, a Predictive IAWD, (Pre-IAWD) initially assigns inbound work, such as a user request, to an agent in a group of agents based on a dynamically generated prediction of how soon the work can be completed. The Pre-IAWD initially assigns (queues) the work to the agent having the highest likelihood of completing the work first in the group of agents, to expedite the completion of the work. The Pre-IAWD predicts which agent is most likely to complete the work first using an algorithm based on dynamically measured factors, such as a current work load of each agent, a priority of the work, and an experience level and skill set of each agent. Also, high priority work is initially assigned to an agent ahead of low priority work already assigned to the agent to expedite the high priority work.

According to another aspect of the present invention, a Proactive IAWD (Pro-IAWD) reassigns queued work (initially assigned to agents by the Pre-IAWD) to agents based on a set of predetermined rules, to maintain an equitable workload across the agent population. Advantageously, the Pre-IAWD prevents excessive work loading of an agent while other agents have less work. Also, high priority work is proactively reassigned to agents based on their current work loads—instead of solely on their initial work loads (as determined at the time work was initially assigned by the Pre-IAWD). The Pre- and Pro-IAWDs work as functional features of a web site and interact with the site's Internet self-service resources and its Internet Automatic Work Distributor (IAWD).

These and other objects of the present invention are achieved by a computer-implemented method of distributing on-line client requests to human and/or robotic Internet service agents. A request is received from a client. An initial agent is selected that is most likely to finish servicing the request first from a group of agents. The request is assigned to the initial agent. In a pro-active mode, an assigned request is reassigned from a first agent to a second agent selected from the group of agents if it is determined that the second agent can complete the request sooner than the first agent.

The foregoing and other objects of the invention are achieved by a computer architecture including receiving a request from a client. An initial agent is selected using selecting means that is most likely to finish servicing the request first from a group of agents. The request is assigned by assigning means to the initial agent. An assigned request is reassigned using reassigning means from a first agent to a second agent selected from the group of agents.

The foregoing and other objects of the invention are achieved by an article including a computer readable medium having stored thereon a plurality of sequences of instructions, the plurality of sequences of instructions including sequences of instructions which, when executed by a processor, cause the processor to perform the steps of receiving a request from a client. The processor then selects an initial agent most likely to finish servicing the request first from a group of agents and assigns the request to the initial agent. The processor then reassigns an assigned request from a first agent to a second agent selected from the group of agents.

The foregoing and other objects of the invention are achieved by a computer system including a processor and a memory coupled to the processor, the memory having stored therein sequences of instructions which, when executed by the processor, causes the processor to receiving a request from a client. The processor then selects an initial agent most likely to finish servicing the request first from a group of agents and assigns the request to the initial agent. The processor reassigns an assigned request from a first agent to a second agent selected from the group of agents.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS.

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for assigning on-line client requests to Internet service agents are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
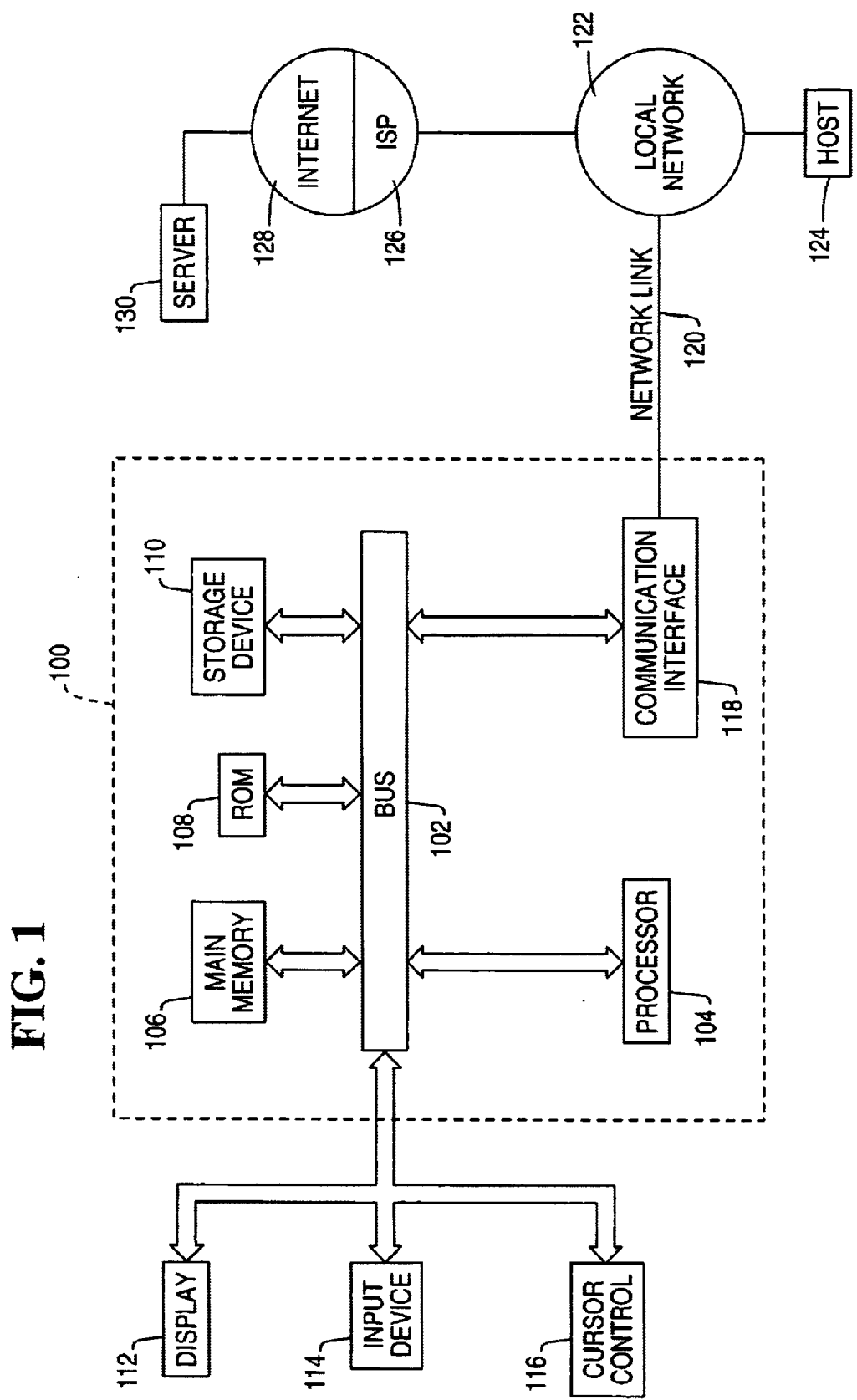
FIG. 1 is a high level block diagram of a computer system usable with the present invention.

FIG. 1 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g.,) allowing the device to specify positions in a plane.

The invention is related to the use of a computer system 100, such as the illustrated system, to assign on-line customer requests to Internet self-service agents who form and deliver appropriate customer responses. According to one embodiment of the invention, assignment of on-line customer requests is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electro infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information. Of particular note, the communications through interface 118 may permit transmission or receipt of on-line requests. For example, two or more computer systems 100 may be networked together in a conventional manner with each using the communication interface 118.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave.

Figure 2:
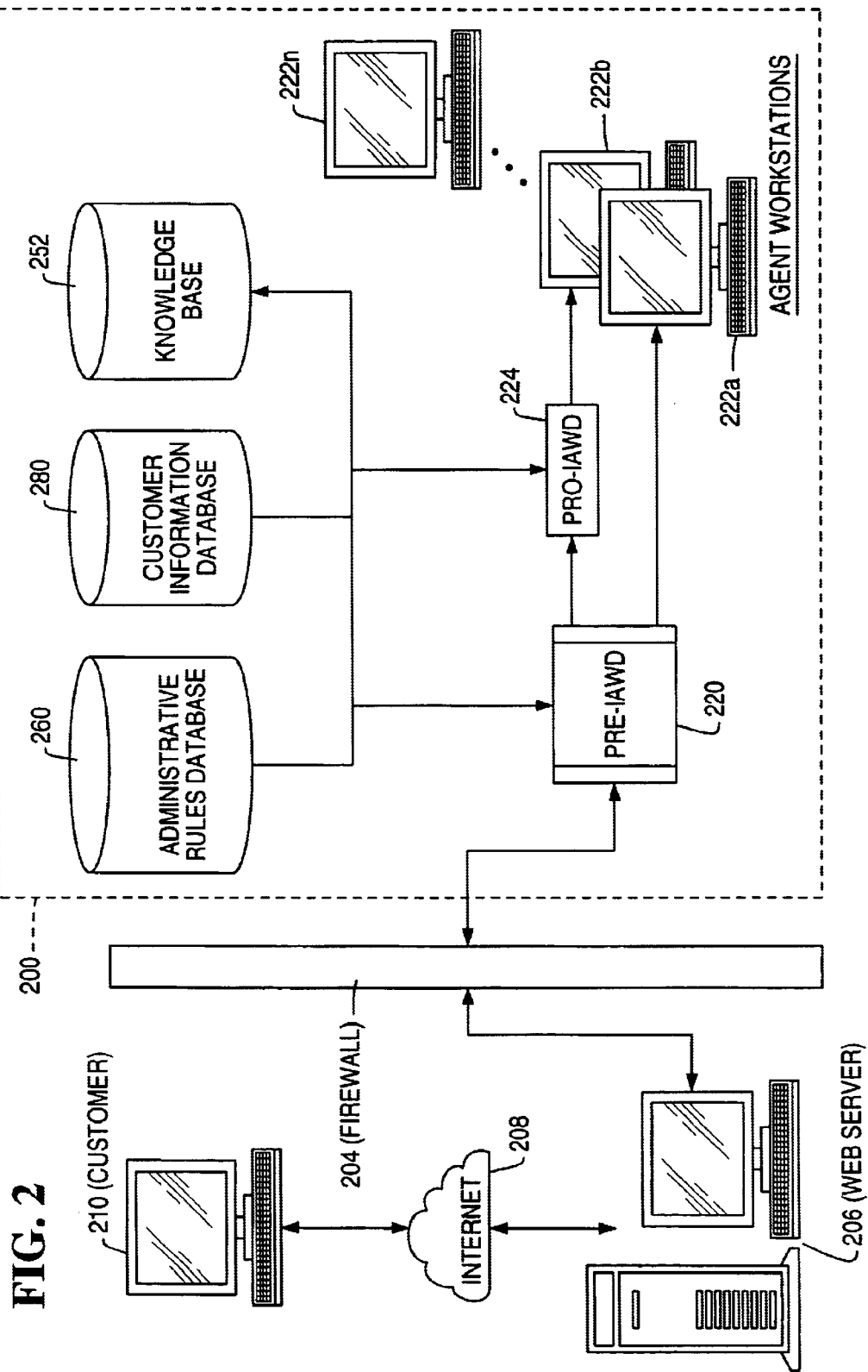
FIG. 2 is a logical architecture and flow diagram of the apparatus and method according to the present invention.

Referring to FIG. 2, a logical architecture for the apparatus 200 of the present invention is depicted. The apparatus 200 is coupled to a firewall 204. The firewall 204 in turn is coupled to a web server 206. The web server 206 is coupled to the Internet 208. A user 210, such as a customer or client, is connected to the Internet 208.

The apparatus 200 includes a Predictive Internet Automatic Work Distributor (Pre-IAWD) 220 for initially assigning user requests sent by customer 210 via the Internet 208 to the web server 206 and through the firewall 204 to a plurality of agent work stations 222a, 222b, 222n coupled to the Pre-IAWD 220. A Proactive Internet Automatic Work Distributor (Pro-IAWD) 224, coupled to the Pre-IAWD 220 and agent work stations 222a–222n, reassigns the user requests to the agent work stations after the requests are initially assigned to the agent workstations by the Pre-IAWD. The Pre-IAWD 220 and the Pro-IAWD 224 can be coupled to robotic Internet self-service agents as well as agent work stations 222n. A "robotic" resource represents CPU, memory, etc. Thus, work is distributed to resources that may be on different distributed servers, i.e., "load balancing." A knowledge base 252 is coupled to both Pre-IAWD 220 and Pro-IAWD 224. An Administrative Rules database 260 provides rules to both Pre-IAWD 220 and Pro-IAWD 224. A Customer Information Database 280 is connected to both Pre-IAWD 220 and Pro-IAWD 224. Pre-IAWD 220 and Pro-IAWD 224 are each coupled with a IAWD disclosed in co-pending application Ser. Nos. 09/410,994 and 09/410,996, which is also coupled with work stations 222a–222n.

Figure 3:
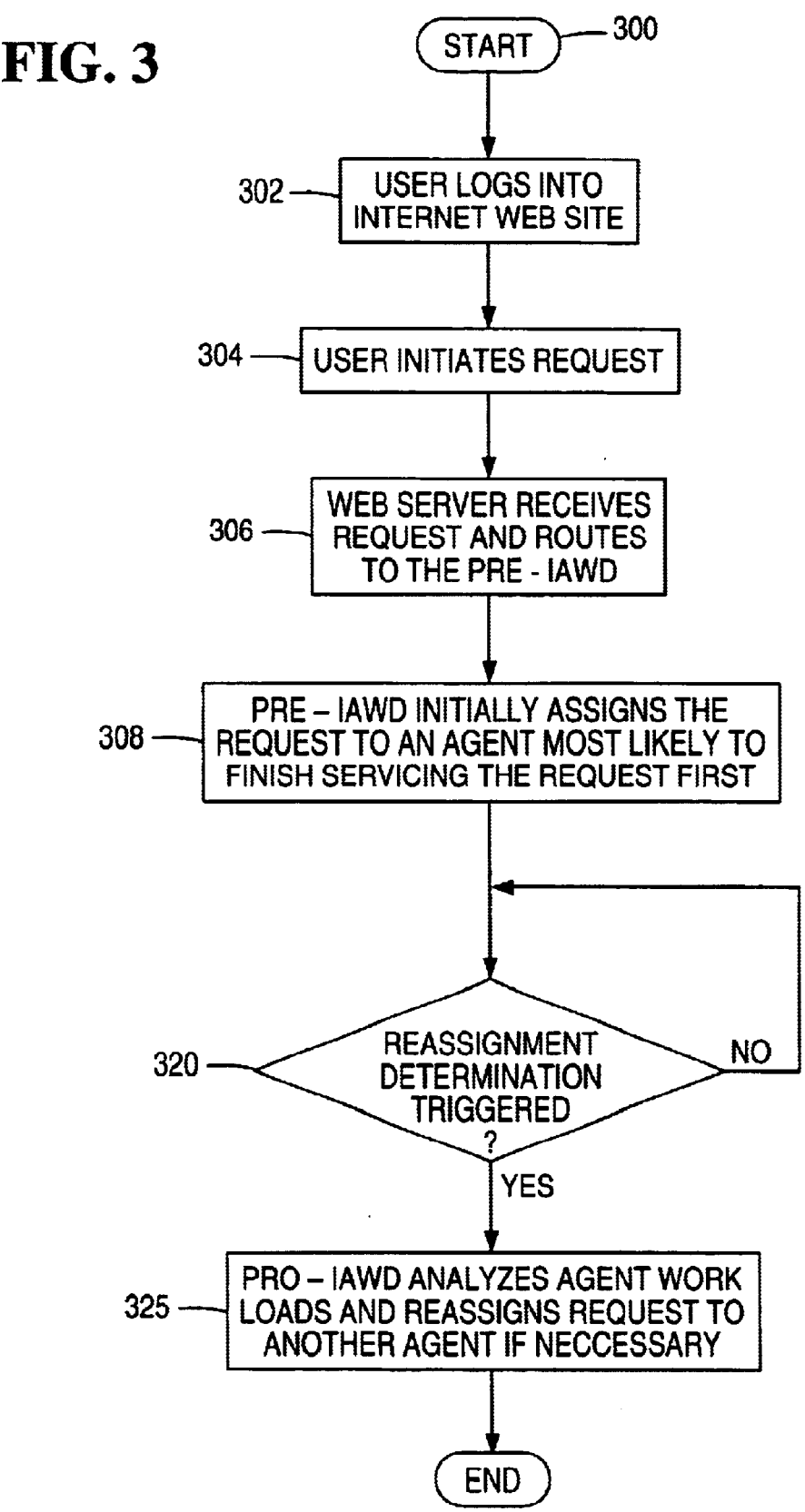
FIG. 3 is a flow diagram of the method according to the present invention.

A flow diagram is depicted in FIG. 3, which illustrates an initial assignment and then a reassignment of a user request by system 200. A user request could be submitted to an Internet call center via e-mail, filling out a form, recording a question using voice, clicking on pre-selected "questions" in a trouble report, or the like. The process begins at step 300. At step 302, a user logs into company XYZ's Internet Self-Service web site at customer client computer 210. At step 304, the user initiates a request concerning some XYZ product, service, etc. At step 306, XYZ's Web Server 206 receives the request over the Internet 208 and routes it to the Pre-IAWD 220. At step 308, the Pre-IAWD 220 predicts which agent is most likely to finish servicing the request first in the group of agents corresponding to the agent workstations 222a–222n, and then initially (queued) assigns the request to that agent. The Pre-IAWD 220 predicts which agent is most likely to finish servicing the request first using a Pre-IAWD algorithm that uses input from the Customer Information Database 280, the Administrative Rules Database 260 and if necessary, the knowledge base 252.

To predict which agent is most likely to finish servicing the request first, the Pre-IAWD 220 determines and uses characteristics of the request such as a priority of the request, a subject matter or topic of the request, and an average time the group of agents takes to service the request. With regard to priority, for example, a trouble resolution request may have a higher priority than a request for information. Priority can be determined explicitly by an end user assigning the priority or by the system identifying that the customer is a "priority user." Alternatively, priority can be determined implicitly by the system parsing the subject or body of the request, or by applying heuristics to the request. The subject matter or topic of the request can be determined either explicitly or implicitly in the same manner. The topic might be indeterminable or unknown.

Additionally, the Pre-IAWD 220 dynamically measures/determines and then uses the following factors/variables to predict which agent is most likely to finish servicing the request first:

a number of available agents at a given time;

an experience level of each agent, including, for example, the length of time an individual has been an agent and whether the agent is being trained;

an expertise level or skill set of each agent relating to the subject matter or topic of the request;

identification of the user;

whether the subject matter of each service request queued for each agent matches the agent's skill set;

a number and type (e.g., simple query or problem report) of service requests queued for each agent;

the priority of each service request queued for each agent;

a running average time an agent (or the entire group of agents) with a particular skill set takes to 6 service a request on a particular topic;

a running average time an agent (or the entire group of agents) takes to service a request relating to an unknown topic; and for each agent currently servicing a request, the elapsed time the agent has spent servicing the request.

The aforementioned request characteristics and factors/variables are exemplary and are not to be taken as limiting. Therefore, the Pre-IAWD 220 can consider additional characteristics and factors necessary to tailor the present invention to a specific application.

The Pre-IAWD 220 uses a variety of algorithms to predict which agent is most likely to finish servicing the request first. One possible algorithm scenario for the Pre-IAWD 220 is now discussed. First, the Pre-IAWD 220 determines the priority of the request by parsing the subject/body of the request subject/body or identifying that the user merits priority treatment. The Pre-IAWD 220 also determines the priority of all current requests currently being serviced by each agent in the group. If the request (i.e., the unassigned request) has a higher priority than the current request, then the unassigned request should be initially assigned to an agent by "bumping" the lower priority queued request. In other words, the unassigned higher priority request is assigned ahead of a lower priority request previously assigned by the Pre-IAWD 220 to an agent. An agent's current work shouldn't be bumped. The high priority work request should be queued ahead of other work items for that agent who might be able to get to that work item first (actually, the agent who can complete the work request first).

Assuming several agents are available to service the unassigned request after the Pre-IAWD 220 bumps lower priority queued requests, the Pre-IAWE 220 predicts which of the several agents will first become available to service the unassigned request. Other algorithms are possible. This is only an example of one way to do this. To make this prediction, the Pre-IAWD 220 uses the elapsed time each of the several agents has spent servicing his or her current request, and the running average time each of the several agents takes to service his or her current request (taking into account, for example, whether a good match exists between the skill set of each of the several agents and the subject matter of his or her current request).

It should be appreciated that request priorities can change dynamically over time. For example, the priority of a request can be automatically escalated after the request is assigned to an agent if the agent does not begin servicing the request within a predetermined time after the request is assigned. The Pre-IAWD 220 should thus anticipate such changes in the priorities of queued requests when determining which agent a request should initially be assigned to.

Say queued work items "age" if they are not worked by an agent. EG. If MSG'X' (low priority) is not worked in 24 hours, it becomes medium priority. If medium priority items not worked in 12 hours, it becomes high priority.

So, if new work arrives (it's high priority), pre-IAWD 220 can determine whether any queued medium priority work will shortly become high priority. The pre-IAWD 220 would put the new work behind this queued work as shown below:

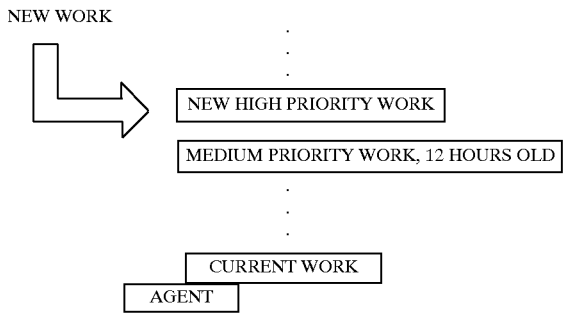

The IAWD predicts that an existing medium priority work item will soon "age." In this case, this will have a higher priority than a newly arrived high priority work item.

It should also be appreciated that the one of the several agents predicted to finish servicing his or her current request first may not be the agent predicted to finish servicing the unassigned request first because it may take the agent an inordinate amount of time to service the unassigned request once it is initially assigned to the agent. For example, an agent A is predicted to finish servicing his or her current request five seconds before an agent B. However, agent B is an expert on cables while agent A is not, and the unassigned request relates to cables. As a result, agents A and B take running averages of sixty and fifty seconds to answer a cable question, respectively. These running averages are "historically determined" based on past experience (over one week) these agents take different times to answer these questions. In this case, the Pre-IAWD algorithm initially assigns the cable question to agent B because agent B should be able to answer the cable question five seconds before agent B.

In mathematical terms, the Pre-IAWD algorithm is used to predict a future time $T_{finish}$ for each agent, representing when the agent should finish servicing the unassigned request, assuming the unassigned request is assigned to the agent after the agent finishes servicing his or her current request. The Pre-IAWD algorithm is used to compare these future times between agents and the Pre-IAWD 220 selects the agent most likely to finish servicing the unassigned request first from the group of agents. For each agent, $T_{finish}$ is calculated using the following equation:

$$T_{finish} = RT + (T_{Acurrent\ avg} - ET_{Acurrent}) + T_{Bunassigned\ avg}$$

where RT is the current time, $T_{Acurrent\ avg}$ is the running average time it takes the agent to finish servicing Type A requests, $ET_{Acurrent}$ is the elapsed time the agent has spent servicing the current Type A request, and $T_{Bunassigned\ avg}$ is the average running time the agent takes to service Type B requests. It is to be understood that other suitable equations can be applied to predict which of the agents is most likely to finish servicing the request first.

After the request is initially assigned to an agent at step 308, Pro-IAWM 224 reassigns a request to another agent, when and if necessary. With reference again to FIG. 3, at step 320, a predetermined event triggers a reassignment process. For example, the reassignment process can be triggered periodically by a programmable, timed interval trigger. Alternatively, the reassignment process can be triggered algorithmically, such as "aging" of unworked items.

Pro-IAWD 224 uses a variety of algorithms to trigger the reassignment process. One possible algorithm scenario for Pro-IAWD 224 is now discussed. The algorithmic trigger can be defined as a Work Inequality Score exceeding a predetermined threshold value. For example, for each agent, Pro-IAWD 224 measures an agent work current load (AW). Pro-IAWD 224 also measures an average work load (PW—for population work load) across the group of agents. Next, for each agent, Pro-IAWD 224 calculates a difference in work load (DW) between the agent's work load AW and the population work load PW. That is, for each agent, DW=AW−PW.

Next, for each agent, Pro-IAWD 224 compares DW against a predetermined threshold work value (TW), where TW can be set at, for example, a predetermined percentage of PW. If DW exceeds TW for the agent, then an attempt is made to reassign the agent's work (i.e., requests currently queued for the agent). The intent is to keep each agents DW below TW.

The agent workload AW and the population work load PW can be measured using one or more of the following factors (also mentioned above with reference to the factors/variables for the Pre-IAWD algorithm):

the priority of each request queued for each agent. For example, a request relating to a repair problem may have a higher priority than a request for information; and the running average time an agent (or the entire group of agents) with a particular skill set takes to service a request on a particular topic.

After the reassignment process is triggered at step 320, at step 325, Pro-IAWD 224 reassigns requests assigned to an agent to another agent using one or more predefined rules. Such rules can be enabled and disabled as desired by a system administrator. Also, the system administrator can set a precedence for the rules. That is, if two or more rules are enabled, the Pro-IAWD 224 will invoke one rule before the remaining enabled rules.

For example, e-mail handling rules can be as follows:
Rule 1:delete all messages in in-box.
Rule 2:move message from "boss" to priority box and send alert.
Rule 2 would probably be executed before Rule 1.
Another example is as follows
Rule 1:if 30 minutes before lunch break for agent X, do not reassign work to that agent.
Rule 2:reallocate work every five minutes if DW is less than TW.
Rule 1 should be invoked (takes precedence) over Rule 2. I.e., even if agents Y and Z workload is high, do not reassign work to agent X within 30 minutes of lunch.

Pro-IAWD 224 uses one or more of the following rules to determine whether a reassignment of requests from an agent to other agents is necessary and to which of the other agents the requests should be reassigned:

1) Reassignment based on the number of requests queued (and thus not being serviced) for each agent;
2) Reassignment based on the priorities of the requests queued for each agent;
3) Reassignment to minimize the time taken to finish servicing all of the requests in the system. The time taken for an agent to service specific types of requests is taken into consideration;
4) Reassignment to keep requests within a specific grouping of agents having similar skill sets;
5) Reassignment base on the experience of the agents;
6) Reassignment based on which of the agents is most likely to finish servicing reassigned work first in the group of agents, as described above with reference to initial assignment of requests; and
7) Reassignment based on the Work Inequality Score algorithm described above. Such reassignment attempts to minimize each agent's DW, and thus the standard deviation of PW.

Additional rules can be used by Pro-IAWD 224 so long as the goal of such additional rules is to maintain an equitable distribution of work across the group of agents. There may beexceptions. See where an agent's workload is purposely minimized as previously described.

Figure 4:
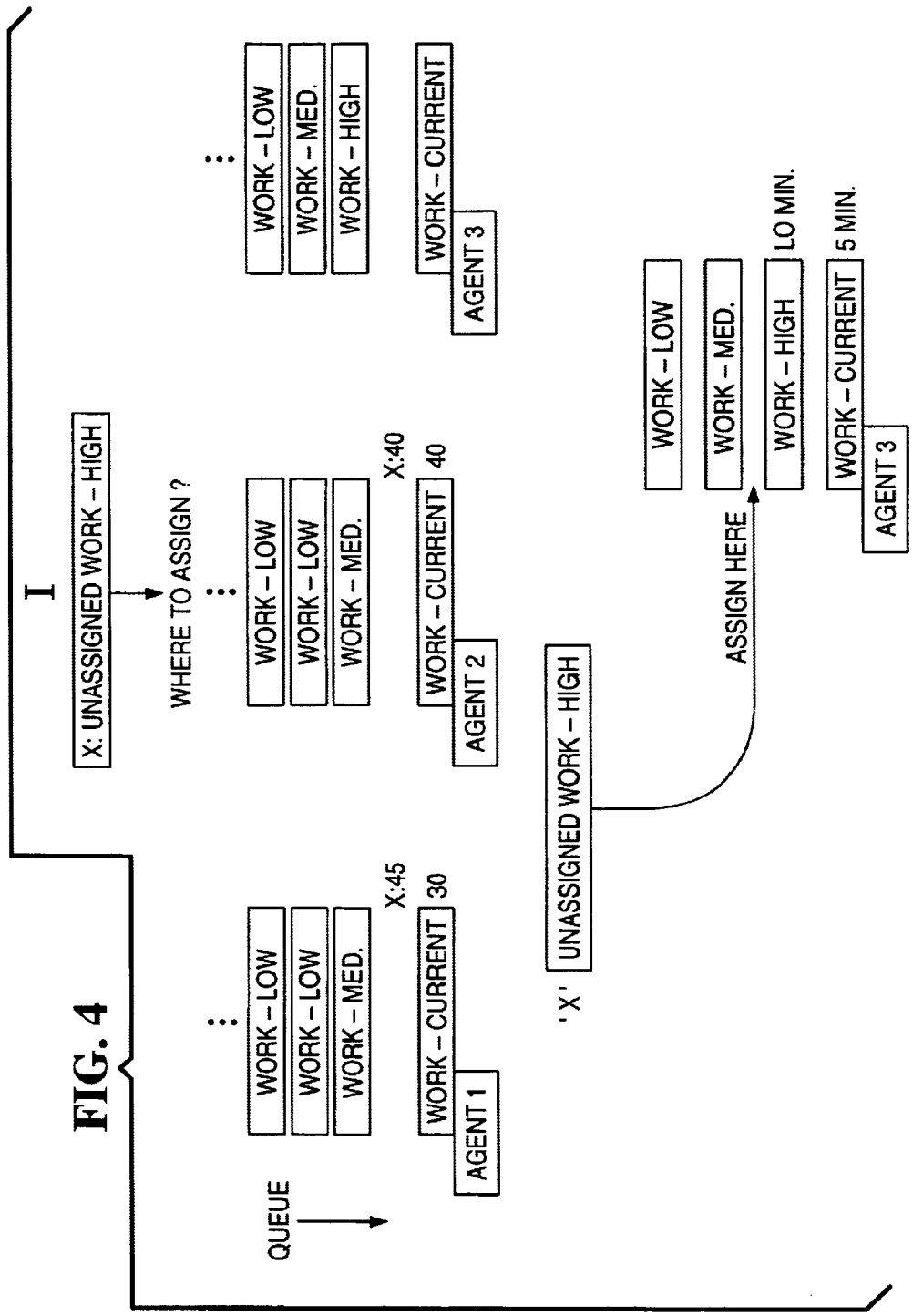
FIG. 4 is a working example.

FIG. 4 depicts a working example of how the present invention is used. As depicted in FIG. 4, X is unassigned work having a high priority and the question is where to assign the work. In this example, agent 1 is new and a slow worker. Agent 1 is predicted to take 30 minutes to complete current work and 45 minutes to complete the unassigned X work. This amounts to a total of 75 minutes to complete the current and unassigned work. In agent 1's queue, is medium work, low work and low work.

Agent 2 is also new but a little faster than agent 1. Agent 2 just started current work which is predicted to take 40 minutes. Agent 2 is estimated to take 40 minutes to complete the unassigned high priority work. Agent 2 has medium priority job and two low priority jobs in agent 2's work queue.

Agent 3 is a seasoned worker and experienced. It is predicted that agent 3's current work will be completed in five minutes and the next work, which is high priority, will take 20 minutes and the X unassigned high priority work will also take 20 minutes. Thus, agent 3 can complete all the current work, a high priority job and the unassigned high priority job in a total of 45 minutes and, therefore, agent 3 can complete the unassigned X work first.

It should now be apparent that a method has been described in which on-line user requests or inquiries are initially assigned agents to expedite servicing of the requests. Also, requests initially assigned are reassigned to maintain an equitable distribution of work- across a group of agents.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A computer implemented method of distributing on-line client requests to human and/or robotic Internet service agents, comprising the following steps:
receiving a request from a client;
determining an average time each agent in a group of agents takes to service a request;
selecting an initial agent most likely to finish servicing the request first from a group of agents;
assigning the request to the initial agent; and
reassigning an assigned request from the initial agent to a second agent selected from the group of agents;
wherein said selecting step comprises:
determining a priority and a topic of the request by parsing the request, and
queuing the request for service by the initial agent ahead of previous requests having lower priorities; and
wherein said selecting step comprises, for each agent in a group of agents,
predicting an availability time when the agent will become available to service the request.

2. The method of claim 1, wherein said selecting step comprises comparing the availability and average times of each agent against the availability and average times of each of the other agents in the group of agents to determine which agent is most likely to finish servicing the request first.

3. The method of claim 1, wherein said selecting step comprises, for each agent in the group of agents, determining an elapsed time the agent has spent servicing a respective current request; and determining an average time the agent takes to service the respective current request.

4. The method of claim 2, wherein said step of determining the average time the agent takes to service the request includes the steps of: determining an experience level of the agent; determining a skill set of the agent; and comparing the skill set to the topic of the request.

5. The method of claim 1, wherein said selecting step comprises escalating the priority of the request after the request is assigned to an agent if the agent does not begin servicing the request within a predetermined time after the request is assigned to the agent.

6. The method of claim 1, wherein said selecting step includes selecting the initial agent based on at least one of a number of available agents, a skill set of each agent, an experience level of each agent, a number of requests queued for each agent, a running average time it takes for each agent having a specific skill set to service predetermined types of requests including information requests and repair requests.

7. The method of claim 1, further comprising at least one of triggering the reassigning step at periodic intervals in response to a periodic trigger event, and triggering the reassigning step when a work load of the initial agent exceeds a current average work load for each agent computed across the group of agents by a predetermined amount.

8. The method of claim 1, wherein the reassigning step comprises selecting one or more rules from a set of rules and reassigning the assigned request based on the one or more selected rules.

9. The method of claim 8, wherein the reassigning step comprises setting a precedence level among two or more selected rules such that one of the selected rules takes precedence over the remaining selected rules.

10. The method of claim 8, wherein said reassigning step comprises reassigning the request based on at least one of a total number of requests currently queued for and not being serviced by each agent, a priority level of each request currently queued for each agent, an experience level of each agent, and determining which agent is most likely to finish servicing the assigned request first.

11. The method of claim 1, wherein said reassigning step comprises for each agent:
   determining a difference between a current work load of the agent and a current average work load of each agent computed across the group of agents;
   comparing the determined difference against a predetermined threshold amount; and
   reassigning the assigned request based on the results of each of said comparing steps.

12. The method of claim 11, wherein the current work load of each agent is based on one of the priorities of respective requests assigned to the agent, a number of requests assigned to the agent, and an average time it takes the agent to completely service a specific type of request including an information request and a repair request.

13. A computer implemented method of distributing on-line client requests to human and/or robotic Internet service agents, comprising the following steps:
   determining an average time each agent in a group of agents takes to service a request;
   receiving a request from a client and assigning the request to an initial agent in a group of agents; and
   reassigning the request from the initial agent to a subsequent agent selected from the group of agents in response to a trigger event;
   wherein said selecting step comprises:
      determining a priority and a topic of the request by parsing the request, and
      queuing the request for service by the initial agent ahead of previous requests having lower priorities; and
      wherein said selecting step comprises, for each agent in a group of agents,
      predicting an availability time when the agent will become available to service the request.

14. The method of claim 13, comprising one of periodically triggering said reassigning step and algorithmically triggering said reassigning step, said algorithmically triggering step including generating said trigger event when a work load of the first agent exceeds a current average work load for each agent computed across the group of agents by a predetermined amount.

15. The method of claim 13, wherein the reassigning step comprises:
   selecting one or more rules from a set of rules, and, if two or more rules are selected, setting a precedence level among two or more of the selected rules such that one of the selected rules takes precedence over the remaining selected rules, and
   selecting the subsequent agent from the group of agents using the selected rules, said one or more rules being base on at least one of a total number of requests currently queued for and not being serviced by each agent, a priority level of each request currently queued for each agent, an experience level of each agent, and determining which agent is most likely to finish servicing the request first.

16. A computer architecture, comprising:
   receiving means for receiving a request from a client;
   determining means for determining an average time each agent in a group of agents takes to service a request;
   selecting means for selecting an initial agent most likely to finish servicing the request first from a group of agents;
   assigning means for assigning the request to the initial agent; and
   reassigning means for reassigning an assigned request from a first agent to a second agent selected from the group of agents;
   wherein said selecting means comprises:
      another determining means for determining a priority and a topic of the request by parsing the request, and
      a queuing means for queuing the request for service by the initial agent ahead of previous requests having lower priorities; and
      wherein said selecting means comprises, for each agent in a group of agents,
      a predicting means for predicting an availability time when the agent will become available to service the request.

17. An article including a computer readable medium having stored thereon a plurality of sequences of instructions, said plurality of sequences of instructions including sequences of instructions which, when executed by a processor, cause said processor to perform the steps of:
   receive a request from a client;
   determine an average time each agent in a group of agents takes to service a request;
   select an initial agent most likely to finish servicing the request first from a group of agents;
   assign the request to the initial agent; and
   reassign an assigned request from a first agent to a second agent selected from the group of agents;
   wherein said selecting step comprises:
      determining a priority and a topic of the request by parsing the request, and
      queuing the request for service by the initial agent ahead of previous requests having lower priorities; and
      wherein said selecting step comprises, for each agent in a group of agents,
      predicting an availability time when the agent will become available to service the request.

18. A computer system, comprising:
   a processor; and
   a memory coupled to said processor, the memory having stored therein sequences of instructions which, when executed by said processor, cause said processor to:
   receive a request from a client;
   determine an average time each agent in a group of agents takes to service a request;
   select an initial agent most likely to finish servicing the request first from a group of agents;
   assign the request to the initial agent; and
   reassign an assigned request from a first agent to a second agent selected from the group of agents;

wherein said selecting an initial agent comprises:
determining a priority and a topic of the request by parsing the request, and
queuing the request for service by the initial agent ahead of previous requests having lower priorities; and wherein said selecting an initial agent comprises, for each agent in a group of agents,
predicting an availability time when the agent will become available to service the request.

* * * * *